(12) United States Patent
Mitry

(10) Patent No.: US 9,031,578 B2
(45) Date of Patent: May 12, 2015

(54) SYSTEM AND METHOD FOR GENERATING INFORMATION REGARDING DEMOGRAPHIC COMPOSITION OF LOCATIONS

(76) Inventor: Daniel Mitry, New York, NY (US)

( * ) Notice: Subject to any disclaimer, the term of this patent is extended or adjusted under 35 U.S.C. 154(b) by 123 days.

(21) Appl. No.: 13/281,807

(22) Filed: Oct. 26, 2011

(65) Prior Publication Data

US 2013/0109408 A1    May 2, 2013

(51) Int. Cl.
*H04W 24/00* (2009.01)
*H04W 4/20* (2009.01)
*H04W 4/04* (2009.01)

(52) U.S. Cl.
CPC ............... *H04W 4/206* (2013.01); *H04W 4/04* (2013.01)

(58) Field of Classification Search
USPC ......... 455/456.1–457, 404.2; 342/357.2–358, 342/450–465; 705/14.49, 14.5, 14.52, 705/14.54, 14.57, 14.58
See application file for complete search history.

(56) References Cited

U.S. PATENT DOCUMENTS

2002/0090954 A1*  7/2002  Tanaka et al. ................. 455/456
2013/0095859 A1*  4/2013  De Vries .................... 455/456.3

* cited by examiner

*Primary Examiner* — Marcos Torres

(57) ABSTRACT

The present invention is directed to systems and methods for generating information regarding demographic composition of a location using mobile devices associated with individuals at the location. A method of the present invention comprises receiving information indicating presence of one or more mobile devices associated with one or more individuals at a given location and identifying one or more attributes of the individuals. Information regarding demographic composition of the location is generated through use of the one or more attributes of the one or more individuals with which the one or more mobile devices are associated, wherein the one or more attributes may comprise one or more of age, relationship status, sex, sexual orientation, national origin, race, hobbies, occupation or religion.

12 Claims, 7 Drawing Sheets

SYSTEM AND METHOD FOR GENERATING INFORMATION REGARDING DEMOGRAPHIC COMPOSITION OF LOCATIONS

BACKGROUND OF THE INVENTION

Individuals often wish to visit locations, such as commercial establishments, based upon the expected demographic composition of the individuals that frequent such locations. For example, young adults intending to visit a restaurant or bar often obtain recommendations from colleagues or perform searches online to obtain information about one or more restaurant or bar locations and base their decision on whether to visit a given restaurant or bar on, at least in part, the attributes of the individuals that frequent such establishments. Such attributes may include, but are not limited to, for example, the average age, sex, relationship status, hobbies, income level, race, national origin or education level of such individuals.

For example, a user using a search engine may enter a query comprising one or more search terms describing a particular location, such as a restaurant. In response to the query, one or more results may be returned. Included in such results may be one or more reviews of the restaurant, which contain, among other information, descriptions of the attributes of the individuals that frequent such restaurants. For example, one or more reviews may indicate that a given restaurant is often frequented on Saturday evenings by "college students" or "young adults." Similarly, the one or more reviews may indicate that a restaurant is often frequented during weekday lunch hours by "middle-aged businessmen." Alternatively, or in conjunction with the foregoing, a user may request information from friends, colleagues, family, etc., regarding a given location, such as a restaurant. Such friends, colleagues, family, etc., may provide similar information to the user, which the user may utilize in making a decision on whether or not to visit the restaurant, and if so, a time at which to visit the restaurant based upon such information.

Existing techniques for obtaining information regarding a given location, however, do not allow a user to obtain live, current or near-current information regarding locations and the attributes of the one or more individuals at such locations. Rather, existing techniques require a user to make a decision on whether to visit a given location based upon historical data, such as data written in online reviews, information obtained from colleagues and friends, etc. Although techniques exist that allow users to, for example, "check-in" to locations, such information is often stale, requires that individuals at such locations take affirmative steps to make it known of their whereabouts, and/or is only available to a limited set of individuals, which often comprises a preselected set, such as users' friends. Further, such techniques fail to provide information regarding the demographic composition of a location and instead, simply identify the location of one or more individuals if such users elect to identify their locations.

Accordingly, there is a need for systems and methods to provide information that is live, current or near-current regarding the demographic composition of the one or more individuals at one or more locations to thereby allow potential visitors, patrons, marketers, etc., to make an informed decision on whether or not to visit such one or more locations based on such individuals' attributes. Further, there is a need for systems and methods to identify one or more locations at which one or more individuals with desired attributes are currently present to assist users in determining whether to visit such locations or to select a location that has the greatest number of individuals with one or more desired attributes.

SUMMARY OF THE INVENTION

The present invention is directed to systems and method for generating information regarding demographic composition of a location using mobile devices associated with individuals present at the location. According to one embodiment of the present invention, a method for generating information regarding a current demographic composition of a location comprises receiving information indicating presence of one or more mobile devices at a given location, a given mobile device of the one or more mobile devices associated with a given individual of one or more individuals. One or more attributes of the one or more individuals with which the one or more mobile devices are associated are identified, and information regarding demographic composition of the location is generated using the one or more attributes of the one or more individuals with which the one or more mobile devices are associated.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
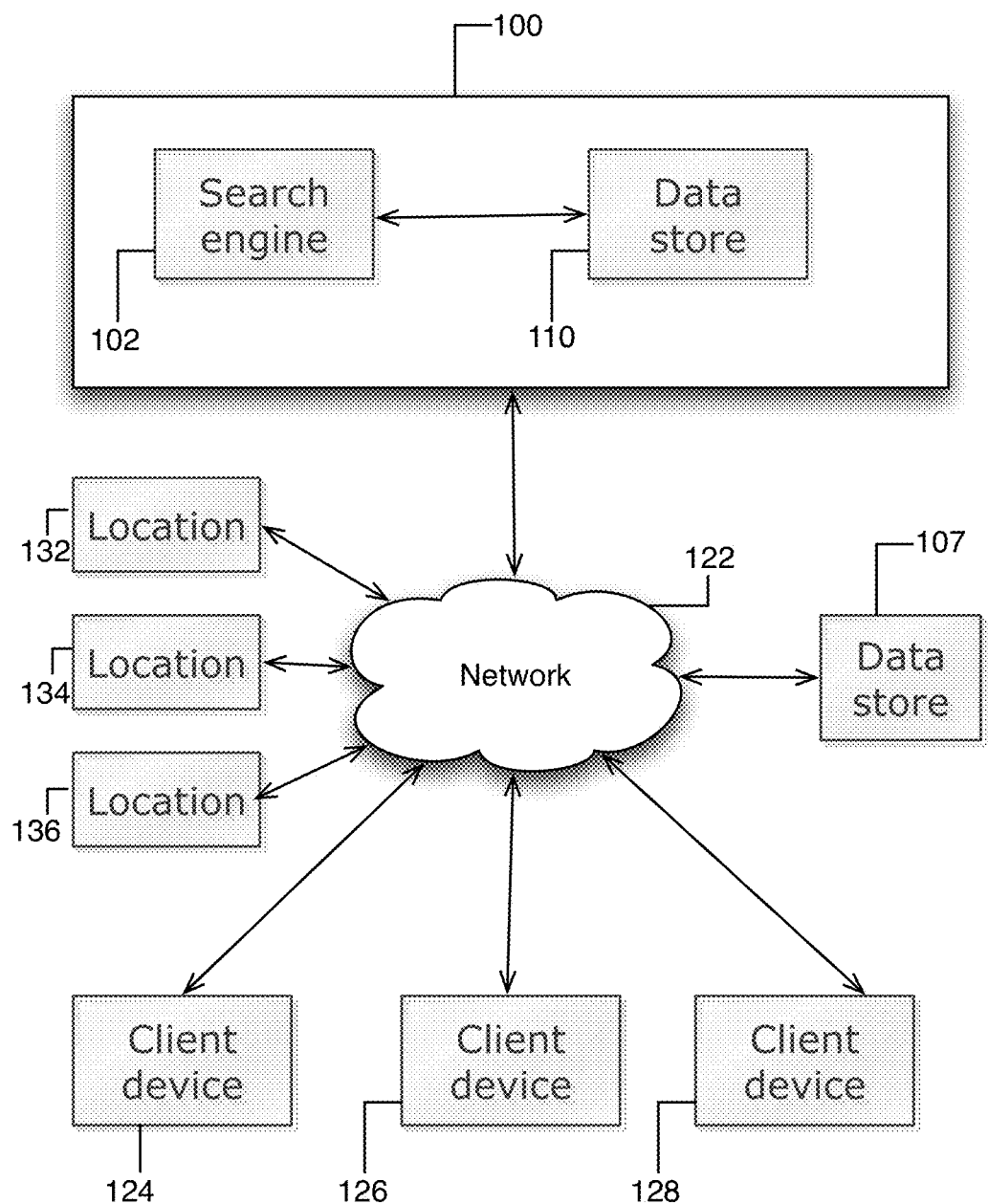
FIG. 1 is a block diagram illustrating one embodiment of a system for providing information to a user regarding the demographic composition of one or more individuals at a given location according to one embodiment of the present invention.

FIG. 1 is a block diagram illustrating one embodiment of a system for providing information to a user regarding the demographic composition of one or more individuals at a given location according to one embodiment of the present invention. According to the embodiment of FIG. 1, client devices 124, 126, and 128 are communicatively coupled to a network 122, which may include a connection to one or more local and/or wide area networks, such as the Internet. According to one embodiment of the invention, a client device 124, 126, and 128 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc., and those of skill in the art understand that such other client devices may be configured to transmit and receive data in a variety of ways, including via wireless local/wide area network communications.

Users of client devices 124, 126, and 128 communicatively coupled to the network 122 may submit search queries, comprising one or more terms, to a search provider 100. For a user of a client device may enter the query "steakhouses NYC," requesting information regarding one or more steakhouse restaurants in the New York City vicinity.

According to one embodiment, a search engine 102 at the search provider 100 may utilize the one or more terms comprising a given query to identify content, which is responsive to the one or more terms comprising the query. According to one embodiment, the search engine 102 at the search provider 100 uses communication pathways that the network 122 provides to access one or more remote 107 or local 110 content data stores to locate content that is responsive to a given query received from a user of a client device 124, 126, and 128. Local 110 and remote 107 content data stores may comprise accessible memory structures such as a database, CD-ROM, tape, digital storage library, etc., and may be implemented as databases, file systems, or any other type of storage structures capable of providing for the retrieval and storage of a variety of content.

According to one embodiment, remote 107 or local 110 content data stores contain demographic information regarding one or more locations 132, 134 and 136. According to one embodiment, locations 132, 134 and 136 comprise, for example, commercial establishments, such as restaurants, bars, clubs, bowling alleys, malls, pool halls, gyms or movie theaters. The demographic information contained in remote 107 or local 110 content data stores regarding locations 132, 134 and 136 includes information regarding attributes of the one or more individual at the locations 132, 134 and 136. For example, such information may comprise the age, sex, marital status, profession, race, national origin or sexual orientation of the one or more individuals currently at locations 132, 134 and 136. According to one embodiment of the invention, information regarding attributes of the one or more individuals at locations 132, 134 and 136 is collected through use of mobile devices associated with the one or more individuals, as well as mobile-detection devices, as described in greater detail herein.

With reference to the abovementioned "steakhouses NYC" query, the search provider 100 may return a listing of one or more steakhouses in the New York City vicinity. Users of client devices 124, 126, and 128 may thereafter select a given steakhouse location 132, 134 and 136 in the New York City vicinity that is returned in the listing. Upon selection of a given steakhouse location 132, 134 and 136, users of client devices 124, 126 and 128 may be presented with an option to obtain information regarding attributes of the one or more individuals currently at the selected steakhouse location 132, 134 and 136. For example, users of client devices 124, 126 and 128 may select a given steakhouse location 132, 134 and 136 and may request information regarding attributes of the one or more individuals currently at the selected steakhouse location 132, 134 and 136. In response to such a request, search provider 100 may return information, including the ages, sexual orientation, sex, relationship status, hobbies, race, national origin and profession, as well as the time of entry into such steakhouse location 132, 134 and 136 associated with the one or more individuals currently at the selected steakhouse location 132, 134 and 136. Users of client devices 124, 126 and 128 may thereafter make an informed decision on whether to visit such steakhouse location 132, 134 and 136 based on the current demographic composition or whether to select a different steakhouse location 132, 134 and 136 that has a demographic composition that is preferable to users of client devices 124, 126 and 128.

Alternatively, or in conjunction with the foregoing, users of client devices 124, 126 and 128 may submit queries to the search provider 100 comprising one or more desired attributes of individuals to allow the search engine 102 at the search provider 100 to perform a search of remote 107 or local 110 content data stores to identify one or more locations 132, 134 and 136 at which one or more individuals with the desired attributes are located. For example, users of client devices 124, 126 and 128 may submit a query specifying the desired attributes "female", "age 25 to 30" and "single". The search engine 102 may thereafter perform a search of remote 107 or local 110 data stores to identify one or more locations 132, 134 and 136 at which individuals with attributes similar or matching "female", "age 25 to 30" and "single" are located. A listing of such responsive locations may be presented to the users of client devices 124, 126 and 128 to allow the users of client devices 124, 126 and 128 to select a given location.

Figure 2:
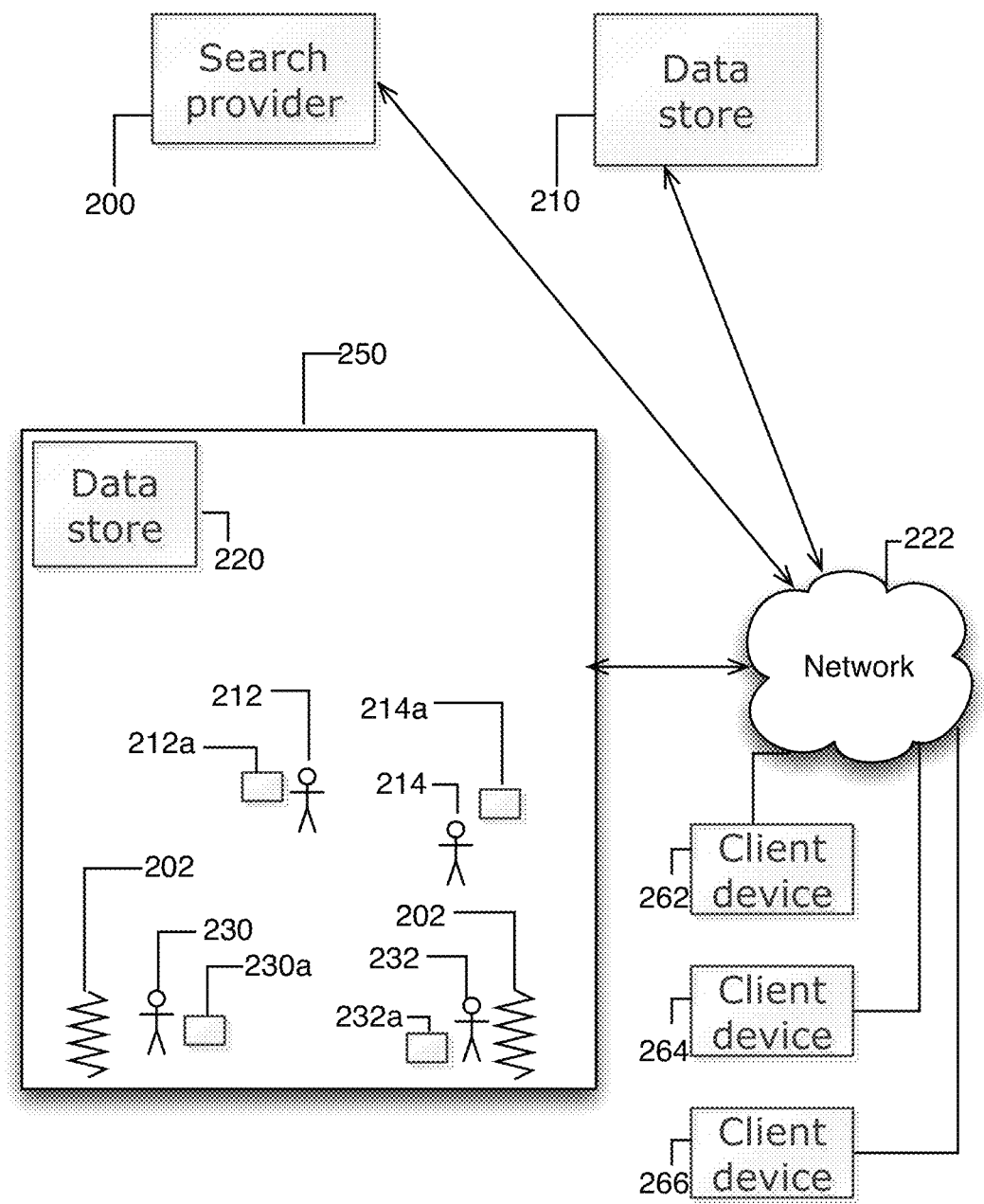
FIG. 2 is a block diagram illustrating one embodiment of a system for generating information regarding the demographic composition of one or more individuals at a given location according to one embodiment of the present invention.

FIG. 2 is a block diagram illustrating one embodiment of a system for generating information regarding the demographic composition of one or more individuals at a given location according to one embodiment of the present invention.

According to the embodiment of FIG. 2, a location 250, which may comprise a restaurant, bar, club, gym, mall, etc., maintains equipment 202 for detecting entry and exit of mobile devices 212a, 214a, 230a and 232a associated with individuals 212, 214, 230 and 232, respectively, into and out of location 250. Upon detecting entry and exit of mobile devices 212a, 214a, 230a and 232a, equipment 202 is operative to receive information from mobile devices 212a, 214a, 230a and 232a regarding one or more attributes of the individuals 212, 214, 230 and 232 with which mobile devices 212a, 214a, 230a and 232a are associated.

For example, according to the embodiment of FIG. 2, individual 230 is associated with mobile device 230a. Upon entering location 250, which may comprise a bar, pool hall, bowling alley, restaurant, movie theatre, gym or any other type of location or establishment, equipment 202 receives an indication of mobile device's 230a entry into location. Concurrently or thereafter, equipment 202 communications with mobile device 230a and receives one or more items of information from mobile device 230a through use of one or more techniques, as described herein. Such information may include one or more attributes associated with individual 230, such as age, sex, relationship status, profession, sexual orientation, race or national origin. Equipment 202 may further generate a timestamp or similar time record indicating the date and time of entry of mobile device 230a.

Those of skill in the art recognize that various techniques and equipment may be used for detecting entry and exit of mobile devices 212a, 214a, 230a and 232a associated with individuals 212, 214, 230 and 232, respectively, and for performing communications between mobile devices 212a, 214a, 230a and 232a and equipment 202 for purposes of obtaining information, including one or more attributes of the individuals 212, 214, 230 and 232 associated with mobile devices 212a, 214a, 230a and 232a, respectively. According to one embodiment of the present invention, radio-frequency identification ("RFID") is used for purposes of communications between equipment 202 and mobile devices 212a, 214a, 230a and 232a. For example, mobile devices 212a, 214a, 230a and 232a may contain one or more RFID tags or labels that may be read by equipment 202, which may comprise an RFID reader. Such RFID tags or labels in mobile devices 212a, 214a, 230a and 232a may contain information regarding attributes of the individuals 212, 214, 230 and 232 with which they are associated. Upon entry and exit of a given individual 230 associated with mobile device 230a containing an RFID tag or label which contains information regarding attributes of individual 230, equipment 202 may perform a read of the RFID tag or label to collect such attribute information.

According to another embodiment of the present invention, near field communication ("NFC") is used for purposes of communications between equipment 202 and mobile devices 212a, 214a, 230a and 232a. For example, mobile devices 212a, 214a, 230a and 232a may contain one or more NFC chips that may be read by equipment 202, which may comprise an NFC chip reader.

According to another embodiment of the present invention, Bluetooth and/or infrared technology may be used for purposes of communications between equipment 202 and mobile devices 212a, 214a, 230a and 232a. Those of skill in the art recognize that various techniques may be used for detecting the entry and exit of mobile devices 212a, 214a, 230a and 232a, and for receiving or collecting information therefrom regarding attributes of the individuals 212, 214, 230 and 232 with which mobile devices 212a, 214a, 230a and 232a are associated.

According to the embodiment of FIG. 2, equipment 202 may communicate with one or more data stores 220, which may comprise accessible memory structures such as a database, CD-ROM, tape, digital storage library, etc., and may be implemented as databases, file systems, or any other type of storage structures capable of providing for the retrieval and storage of a variety of content. Those of skill in the art understand that communication between equipment 202 may be conducted through use of wired or wireless communications, including via wireless local/wide area network communications.

According to one embodiment of the present invention, data store 220 is operative to maintain current information regarding the one or more individuals 212, 214, 230 and 232 that enter and exit location 250. For example, at a given time, data store 220 maintains a listing of the one or more individuals 212, 214, 230 and 232 that are located in location 250, and the attribute information as received from mobile devices 212a, 214a, 230a and 232a associated with individuals 212, 214, 230 and 232. As one or more individuals 212, 214, 230 and 232 enter location 250, equipment 202 communicates the information received from mobile devices 212a, 214a, 230a and 232a associated with individuals 212, 214, 230 and 232 to provide data store 220 with current information regarding the individuals 212, 214, 230 and 232 at location 250. Such information is maintained in data store 220, such as in one or more tables and/or databases. A given entry in such table and/or database may be associated with a given identifier to allow for the location, updating and/or removal of such entry through use of the identifier.

As previously described, equipment 202 is further operative to detect exit of mobile devices 212a, 214a, 230a and 232a associated with individuals 212, 214, 230 and 232 from location 250. According to one embodiment of the present invention, upon equipment 202 detecting exit of mobile devices 212a, 214a, 230a and 232a associated with individuals 212, 214, 230 and 232 from location 250, equipment communicates with data store 220 information indicating the one or mobile devices 212a, 214a, 230a and 232a that have exited location 250. Data store 220 is thereafter updated to indicate that the one or mobile devices 212a, 214a, 230a and 232a have exited location 250. Such update may include updating the entry in the relevant tables and/or databases to indicate that mobile devices 212a, 214a, 230a and 232a have exited location 250 or removing the entry in the relevant tables and/or databases corresponding to mobile devices 212a, 214a, 230a and 232a. Those of skill in the art recognize that removal of entry in the relevant tables and/or databases corresponding to mobile devices 212a, 214a, 230a and 232a may protect privacy of individuals 212, 214, 230 and 232 associated with mobile devices 212a, 214a, 230a and 232a. On the other hand, those of skill in the art recognize that not removing entries in the relevant tables and/or databases corresponding to mobile devices 212a, 214a, 230a and 232a allows for generating historical records and/or patterns of individuals 212, 214, 230 and 232 associated with mobile devices 212a, 214a, 230a and 232a that have visited located 250. Such historical records may also prove useful to identify demographic patterns of individuals that visit certain location 250. For example, such historical records may be used to generate information indicating that location 250 is typically frequented by young, single adults on Friday and Saturdays between the hours of 9 pm to 11 pm, and middle-aged males between the hours of 1 pm and 3 pm during weekdays.

The information maintained in data store 220, which comprises current information associated with the one or more individuals 212, 214, 230 and 232 currently located at location 250, may be delivered to a search provider 200 or one or more remote data stores 210, which may be in communication with search provider 200. According to one embodiment of the present invention, delivery of information from data store 220 to search provider 200 or remote data store 210 is performed on a periodic basis, such as every sixty seconds. According to another embodiment of the present invention, delivery of information from data store 220 to search provider 200 or remote data store 210 is performed upon equipment 202 detecting entry and/or exit of mobile devices 230a and 232a associated with individuals 230 and 232 entering or exiting location 250. Those of skill in the art recognize that delivery of information may occur at other times, including at different periodic intervals, upon detecting entry and/or exit of a given threshold number of mobile devices 212a, 214a, 230a and 232a associated with individuals 212, 214, 230 and 232, at predetermined times, as requested by location 250 owner or search provider 200, etc.

Users of client devices 262, 264 and 266, such as mobile devices, PCs or other client devices, communicatively coupled to a network 222, which may include a connection to one or more local and/or wide area networks, such as the Internet, may request information regarding location 250, such as through use of a search query entered via client devices 262, 264 and 266. According to one embodiment, such request comprising a search query may be delivered to data store 210 or search provider 200. Alternatively, or in conjunction with the foregoing, such request from client devices 262, 264 and 266 may be delivered to data store 220.

In response to a search request from client devices 262, 264 and 266 regarding location 250, users of client devices 262, 264 and 266 are presented with an option to receive current demographic information regarding location 250. Such demographic information regarding location 250 may comprise information regarding attributes of the one or more individuals 212, 214, 230 and 232 at location 250, such as age, sex, sexual orientation, profession, relationship status, race, national origin or religion of the one or more individuals 212, 214, 230 and 232 at location 250, as well as information regarding the time at which individuals 212, 214, 230 and 232 arrived at location 250. Such information may be displayed in a variety of formats. For example, information regarding attributes of the one or more individuals 212, 214, 230 and 232 at location 250 may displayed in an aggregate and anonymous format, such as one or more averages (e.g., the average age of one or more individuals 212, 214, 230 and 232 at location 250). Similarly, information may be displayed as one or more graphs. Those of skill in the art recognize the numerous ways in which information regarding attributes of the one or more individuals 212, 214, 230 and 232 at location 250 may be displayed.

Figure 3:
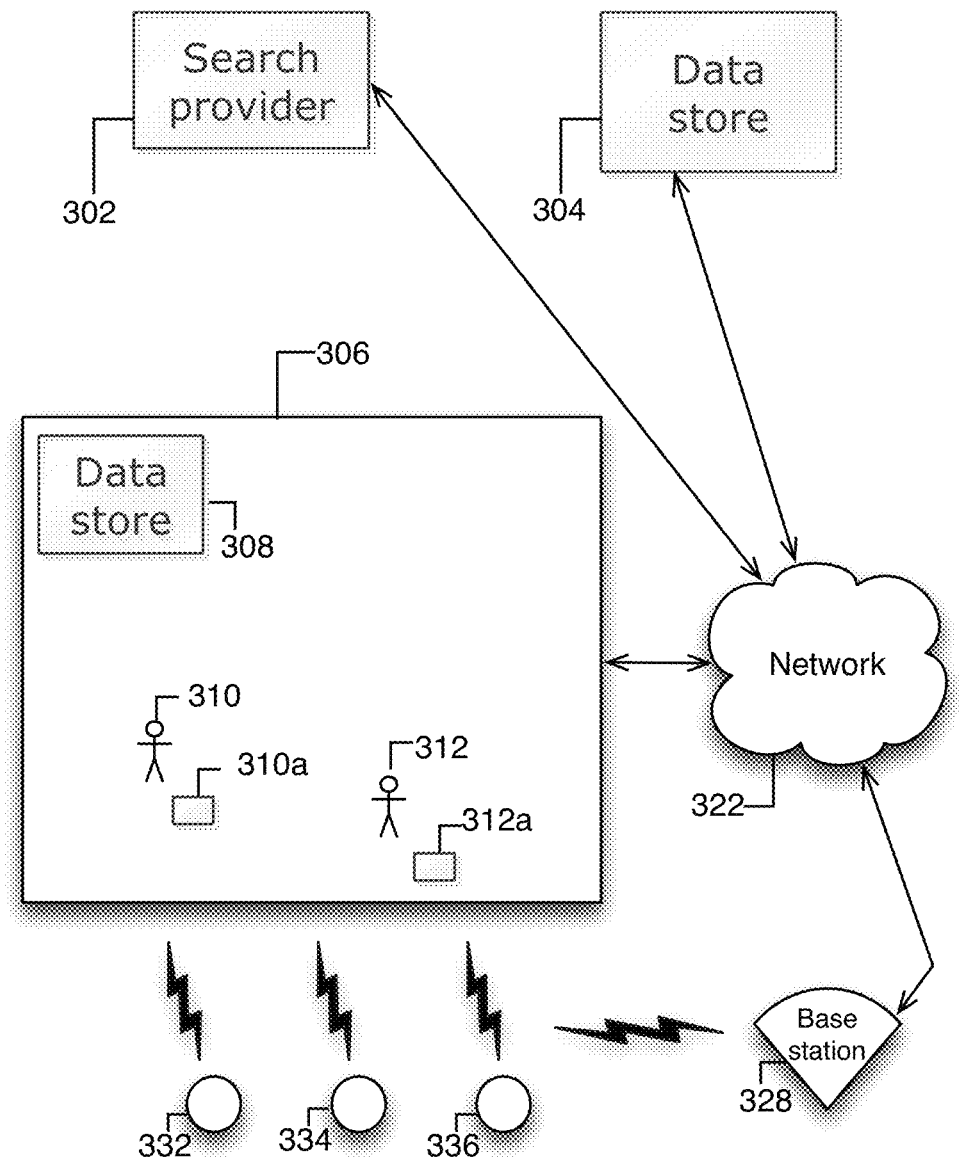
FIG. 3 is a block diagram illustrating another embodiment of a system for generating information regarding the demographic composition of one or more individuals at a given location according to one embodiment of the present invention.

FIG. 3 is a block diagram illustrating an alternative embodiment of a system for generating information regarding the demographic composition of one or more individuals at a given location according to one embodiment of the present invention.

According to the embodiment of FIG. 3, one or more individuals 310 and 312 may visit a given location 306, which may comprise a location such as a bar, club, restaurant, mall, gym or other location one or more individuals may visit. Associated with individuals 310 and 312 are mobile devices 310a and 312a, respectively. Mobile devices 310a and 312a may comprise any mobile device known in the art, such as a mobile phone, smartphone, laptop computer, tablet computer, etc. Mobile devices 310a and 312a may contain various components or modules known in the art, such as wireless communication unit, user input unit, power supply unit, broadcast reception unit, receiver/transceiver module, and a global positioning system ("GPS") module.

The GPS module of mobile devices 310a and 312a may be used to generate or receive position information data from a plurality of GPS satellites 332, 334 and 336. For example, GPS module of mobile devices 310a and 312a may utilize signals from GPS satellites 332, 334 and 336 to identify location of mobile devices 310a and 312a, such as through use of pinging and/or triangulation. Such location identification information may include geographic coordinates of mobile devices 310a and 312a. Although use of GPS is discussed herein for purposes of determining the location of mobile devices 310a and 312a, a variety of different techniques for location may be used to determine location of mobile devices 310a and 312a, including, but not limited to, non-GPS triangulation, pinging, enhanced GPS ("E-GPS"), and other techniques known in the art for determining the location of mobile devices 310a and 312a and identifying geographic coordinates associated therewith.

According to the embodiment of FIG. 3, location information, such as geographic coordinates, regarding the location of mobile devices 310a and 312a is delivered to base station 328, along with attribute information of individuals 310 and 312 with which mobile devices 310a and 312a are associated. Base station 328 is operative to utilize the location information associated with mobile devices 310a and 312a to identify a corresponding commercial or similar location at which mobile devices 310 and 312a are located. Such identification may be performed through use of one or more tables or databases identifying a range of geographic coordinates for one or more commercial locations, such as clubs, restaurants, bars, pool halls, concert halls, gyms, bowling alleys, etc. For example, a given restaurant, "Restaurant XYZ," may be associated with the geographic coordinate range latitude: 37.399107 to 37.654325 longitude: 122.109976 to 122.307791. Location information regarding the location of mobile devices 310a and 312a, as determined through use of, for example, GPS satellites 332, 334 and 336, may indicate that mobile device 310a is located at latitude 37.599107 and longitude 122.208891 and mobile device 312a is located at latitude 37.559106 and longitude 122.232891. Accordingly, base station 328 identifies mobile devices 310a and 312a as located at Restaurant XYZ.

According to the embodiment illustrated in FIG. 3, base station may thereafter transfer, via network 322, the identified location at which mobile devices 310a and 312a are located along with attribute information of the individuals 310 and 312 with which mobile devices 310a and 312a are associated, to search provider 302 or one or more data stores 304 and 308. Search provider 302 and data stores are operative to maintain one or more tables or databases of individuals 310 and 312 and related attribute information, as well as an indication of the location at which mobile devices 310a and 312a, with which individuals 310 and 312 are associated, are currently located.

The location information regarding the location of mobile devices 310a and 312a may be delivered periodically, such as every thirty seconds, or upon detection or generation of any new location information regarding the location of mobile devices 310a and 312a, to provide base station 328, as well as search provider 302 and data stores 304 and 308, with current information regarding the location of mobile devices 310a and 312a. With reference to the above example regarding Restaurant XYZ, updated location information regarding the location of mobile devices 310a and 312a may be delivered to base station 328, such as upon detection by GPS satellites 332, 334 and 336 of the movement of mobile devices 310a and 312a. Base station 328 may thereafter determine that mobile devices 310a and 312a are no longer located at Restaurant XYZ. According to one embodiment of the present invention, Base station 328 uses geographic coordinate information associated with mobile devices 310a and 312a to identify the geographic coordinates of mobile devices 310a and 312a. Base station 328 thereafter performs a search, such as a search of one or more tables or databases, to determine whether the geographic coordinates associated with mobile devices 310a and 312a lie within the geographic coordinate range for one or more locations, such as restaurants, bars, gyms, clubs, etc. If base station 328 determines that mobile devices 310a and 312a are no longer at Restaurant XYZ, base station 328 may thereafter provide an indication that mobile devices 310a and 312a are no longer located at Restaurant XYZ to search provider 302 and data store 304 and 308 via network 322. Such updated information allows search provider 302 and data store 304 and 308 to maintain current information about the location of mobile devices 310a and 312a, as well as information about the one or more individuals with which mobile devices 310a and 312a are associated, including attribute information of individuals 310 an 312.

In a further alternative embodiment, attribute information is retrieved from a user profile associated with individuals 310 and 312 by search provider 302. According to this embodiment, location information indicating the location at which mobile devices 310a and 312a are located, as well as one or more identifiers identifying the individuals 310 and 312 with which mobile devices 310a and 312a are associated are delivered to base station 328. Base station 328 thereafter delivers the location information indicating the location at which mobile devices 310a and 312a are located, as well as one or more identifiers identifying the individuals 310 and 312 with which mobile devices 310a and 312a are associated to search provider 302. Search provider thereafter performs a search to locate one or more user profiles associated with individuals 310 and 312 through use of the one or more identifiers. Such user profiles may contain one or more attributes associated with individuals 310 and 312, which may be used to update one or more tables or databases of individuals 310 and 312 and related attribute information, as well as an indication of the location at which mobile devices 310a and 312a with which individuals 310 and 312 are associated are currently located.

Figure 4:
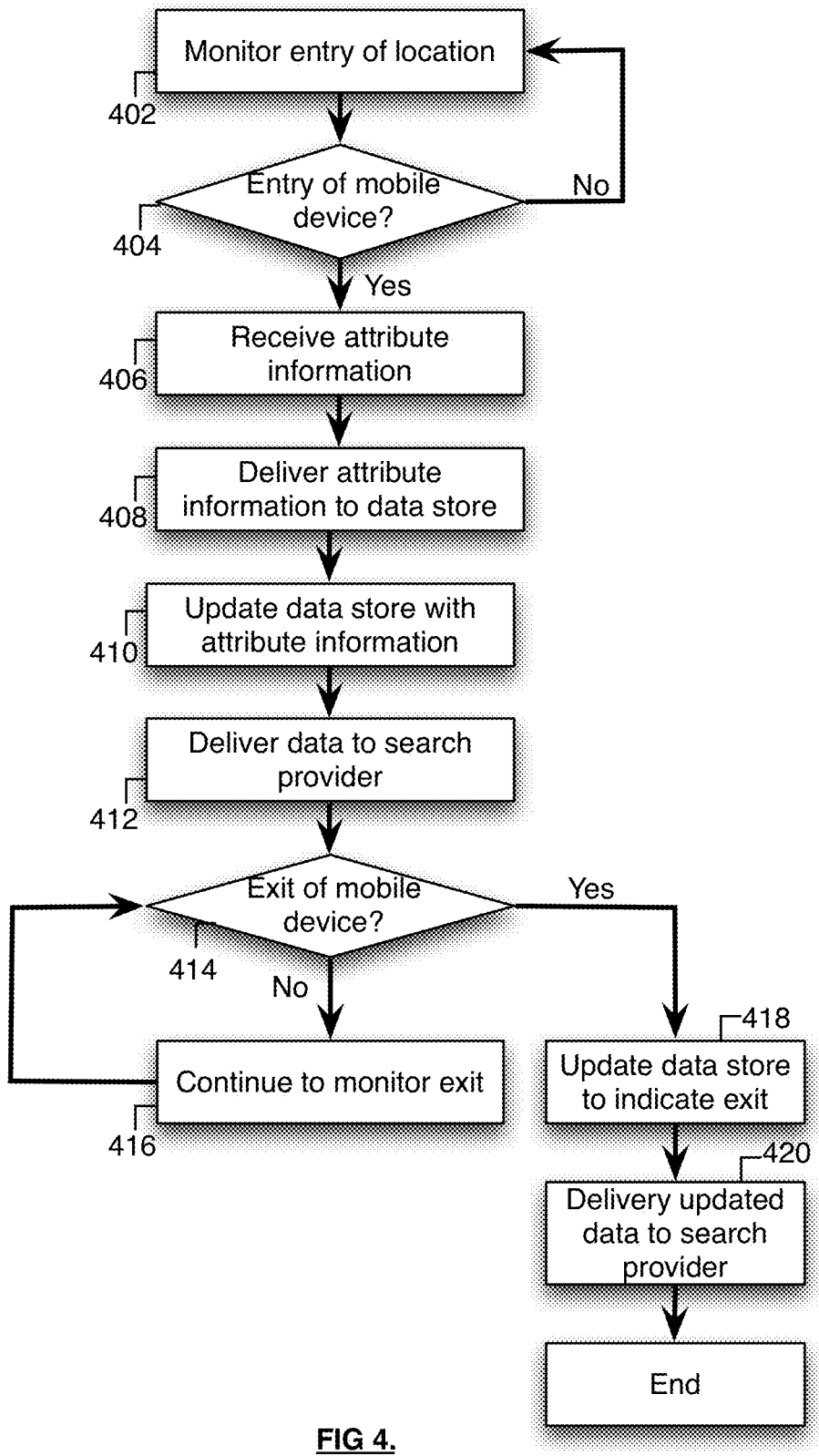
FIG. 4 is a flow diagram illustrating one embodiment of a method for generating information regarding the demographic composition of one or more individuals at a given location according to one embodiment of the present invention.

FIG. 4 is a flow diagram illustrating one embodiment of a method for generating information regarding the demographic composition of one or more individuals at a given location according to one embodiment of the present invention.

According to the embodiment illustrated in FIG. 4, the entry of a given location, such as a restaurant, bar, club or gym, is regularly monitored through use of monitoring equipment to detect the entry of one or more mobile devices associated with individuals entering the location, step 402. According to one embodiment, such monitoring equipment is RFID or NFC reader equipment operative to detect an RFID tag/label or NFC chip associated with a given mobile device, such as a mobile phone, smartphone, laptop computer, tablet computer, etc. According to another embodiment of the present invention, such monitoring equipment is Short Message Service ("SMS") equipment operative to receive an SMS message from a given mobile device indicating a given individual's preference to "opt-in" or otherwise included or excluded in the one or more devices that are monitored for entry with respect to the location. Such "opt-in" and "opt-out" capability allows certain individuals to choose whether or not to be included in the demographic information generated regarding the one or more individuals that enter the location. Other techniques may also be included for purposes of the "opt-in" and "opt-out", such as disabling certain elements of a mobile device from communication with such monitoring equipment.

A check is regularly performed to determine entry of one or more mobile devices associated with one or more users into the location, step 404. If no entry of mobile devices is detected, monitoring of the entrance of location continues, step 402.

Upon detecting entry of a given individual through use of monitoring equipment that detects entry of the mobile device associated with the individual, information regarding one or more attributes of the individual associated with the mobile device is received, step 406. Such receipt of information may be performed through use of an RFID read or an NFC read, which may be used to receive one or more attributes of the individual as maintained in an RFID tag/label or NFC chip in the mobile device associated with the individual. Such attributes may include age, sex, marital status, religion, sexual orientation, profession, education level, etc.

The received attributes of an individual are thereafter delivered to a data store, 408. According to one embodiment of the present invention, a unique identifier for the individual is also delivered to the data store along with the received attributes, wherein a unique identifier comprises an identifier that uniquely identifies the one or more individuals entering the location. Such unique identifier may be generated using a variety of data and/or techniques. For example, such unique identifier may comprise the serial number associated with the mobile device. Alternatively, or in conjunction with the preceding, the unique identifier may comprise a time stamp generated upon entry of a given individual. Those of skill in the art recognize the numerous ways of generating an identifier for a given individual, such as through use of time stamps, hashing, etc.

The data store is thereafter updated with the attribute information of the individual, step 410. According to one embodiment, such updating comprises generating an entry in one or more tables or databases, along with an identifier for the individual with which such attribute information is associated. For example, Table 1 illustrates an exemplary entry for a given individual that entered and/or is identified as present at a location.

TABLE 1

| Identifier | Age | Sex | Profession | Residence | Sexual Orientation | Single |
|---|---|---|---|---|---|---|
| 019XRZ1 | 35 | M | Lawyer | New York | Straight | N |

According to the embodiment illustrated in FIG. 4, upon updating the data store, the information maintained in the data store is delivered to one or more search providers and/or one or more remote data stores, step 412. Such updating allows such search providers and/or remote data stores to provide users that are interested in visiting such location with current information regarding attributes of the one or more users that have entered such location. Such information may allow such users to make an informed decision about whether or not to visit a given location based upon such attributes. For example, a thirty-five year old male interested in meeting thirty to forty year old females that are single could determine, based upon such attribute information, one or more locations that have the greatest number of such single females.

A check is performed to determine whether an individual that has entered the location has exited, step 414. According to one embodiment, this check is performed through use of monitoring of the exit to determine whether the mobile device associated with the individual who has entered the location has exited the location. Such monitoring may be performed according to the same or similar techniques as described with respect to monitoring for entry into the location, as described with respect to step 402. For example, such monitoring may be performed by regularly monitoring equipment to detect the exit of one or more mobile devices associated with individuals exiting the location. According to one embodiment, such monitoring equipment is RFID or NFC reader equipment operative to detect an RFID tag/label or NFC chip associated with a given mobile device, such as a mobile phone, smartphone, laptop computer, tablet computer, etc., that exits the location.

If exit of the mobile device with which the individual is associated is not detected, the monitoring of the exit of the user continues, step 416. Alternatively, if exit of the mobile device with which the individual is associated is detected, the data store is updated accordingly to reflect such exit, step 418. According to one embodiment of the present invention update step 418 comprises removing the entry corresponding to the individual from the data store. According to another embodiment of the present invention, update step 418 comprises indicating that the user has exited in the entry associated with the individual maintained in the data store without deleting such entry associated with the individual. One or more search providers or remote data stores may thereafter be updated with such exit information, step 420. Such updating allows one or more users of client devices interested in visiting the location with current information about the attributes of the one or more individuals at the location.

Figure 5:
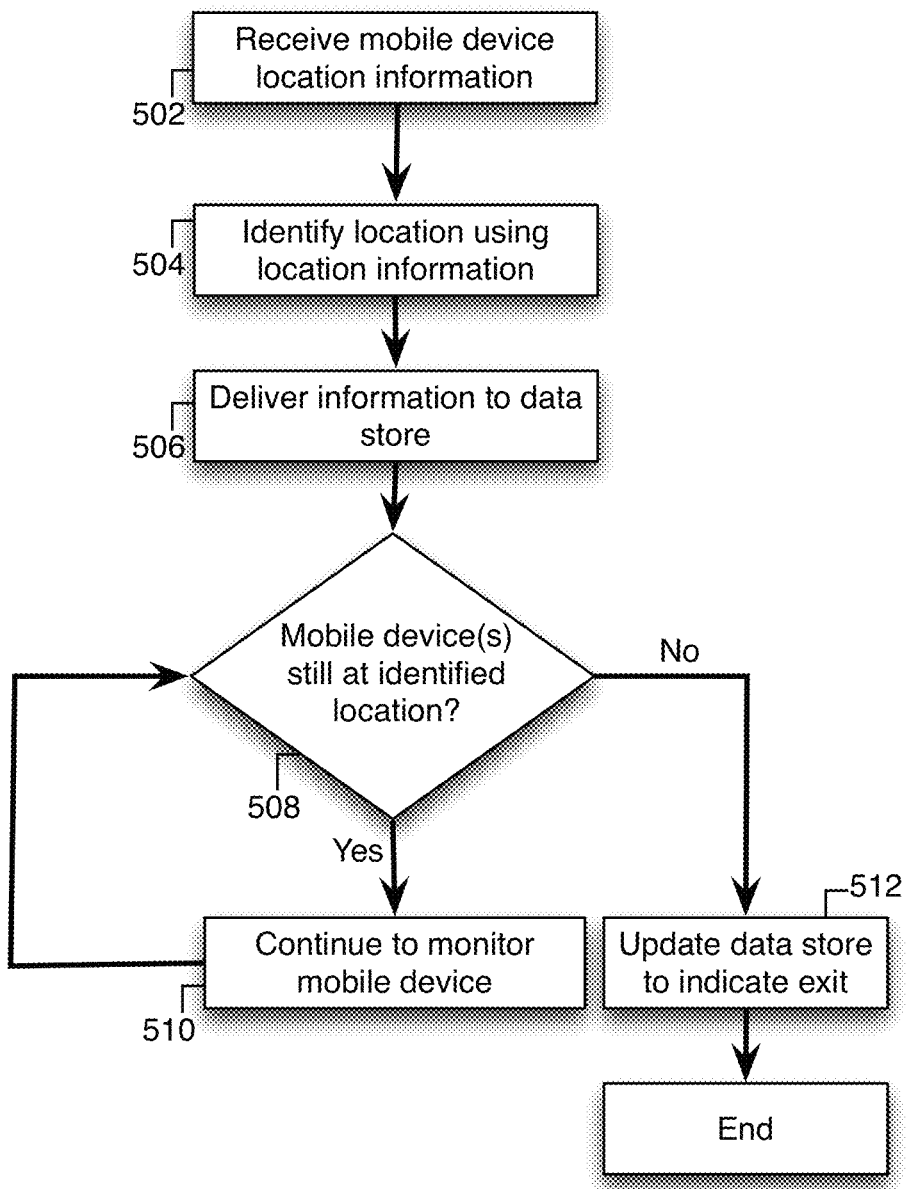
FIG. 5 is a flow diagram illustrating an alternative embodiment of a method for generating information regarding the demographic composition of one or more individuals at a given location according to one embodiment of the present invention.

FIG. 5 is a flow diagram illustrating an alternative embodiment of a method for generating information regarding the demographic composition of one or more individuals at a given location according to one embodiment of the present invention.

According to the embodiment illustrated in FIG. 5, location information for a mobile device is received, step 502. Such location information may comprise geographic coordinates of the mobile device obtained through use of GPS satellites and location modules associated with such mobile device. Such location information may also be obtained through triangulation or other techniques known in the art for identifying a location of a mobile device.

A search is thereafter performed to identify the location to which the location information identified for the mobile device corresponds, step 504. According to one embodiment of the present invention, a search is performed to identify a range of geographic coordinates within which location information for a given mobile device falls. For example, a given mobile device may be associated with location information comprising latitude X1 and longitude Y1. Accordingly, a search may be performed to identify a location, such as a bar, restaurant, club, etc., in which latitude X1 and longitude Y1 may lie.

The location to which the location information identified for the mobile devices corresponds, as well as an identifier for the mobile device, is thereafter delivered to one or more data stores, step 506. Such one or more data stores may maintain information identifying the one or more mobile devices and individuals with which such mobile devices are associated, as well the one or more locations at which such mobile devices are located. Such data store may further contain attribute information, as described herein.

A check is thereafter performed to determine whether the mobile device is still at the identified location, step 508. Such check may comprise receiving updated location information, such as geographic coordinates, for the mobile device and determining whether such updated location information falls outside the identified location. For example, updated geographic coordinates for a given mobile device may be received and a comparison made to determine whether such geographic coordinates fall within or outside of the range of the geographic coordinate range for the location at which the mobile device was identified as being located.

If the mobile device is no longer at the identified locations, the one or more data stores maintaining information identifying the one or more mobile devices and individuals with which such mobile devices are associated, as well the one or more locations at which such mobile devices are located, are updated, step 512. Such updating may comprise supplementing an entry in one or more tables or databases with information that a given mobile device is no longer at a given location, or removing an entry for a given mobile device that identifies the mobile devices at a given location in the one or more relevant tables or databases.

If the mobile device is still at the identified location, the mobile device is continuously monitored, step 510, and processing returns to step 508, where a check is regularly performed to determine if the mobile device is still at the identified location, step 508, which, as described, may comprise receiving regular updates of the geographic coordinates of the mobile device through use of, for example, GPS and/or triangulation. Those of skill in the art recognize that the method described with respect to FIG. 5 may be performed on one or more mobile devices with respect to one or more locations.

Figure 6:
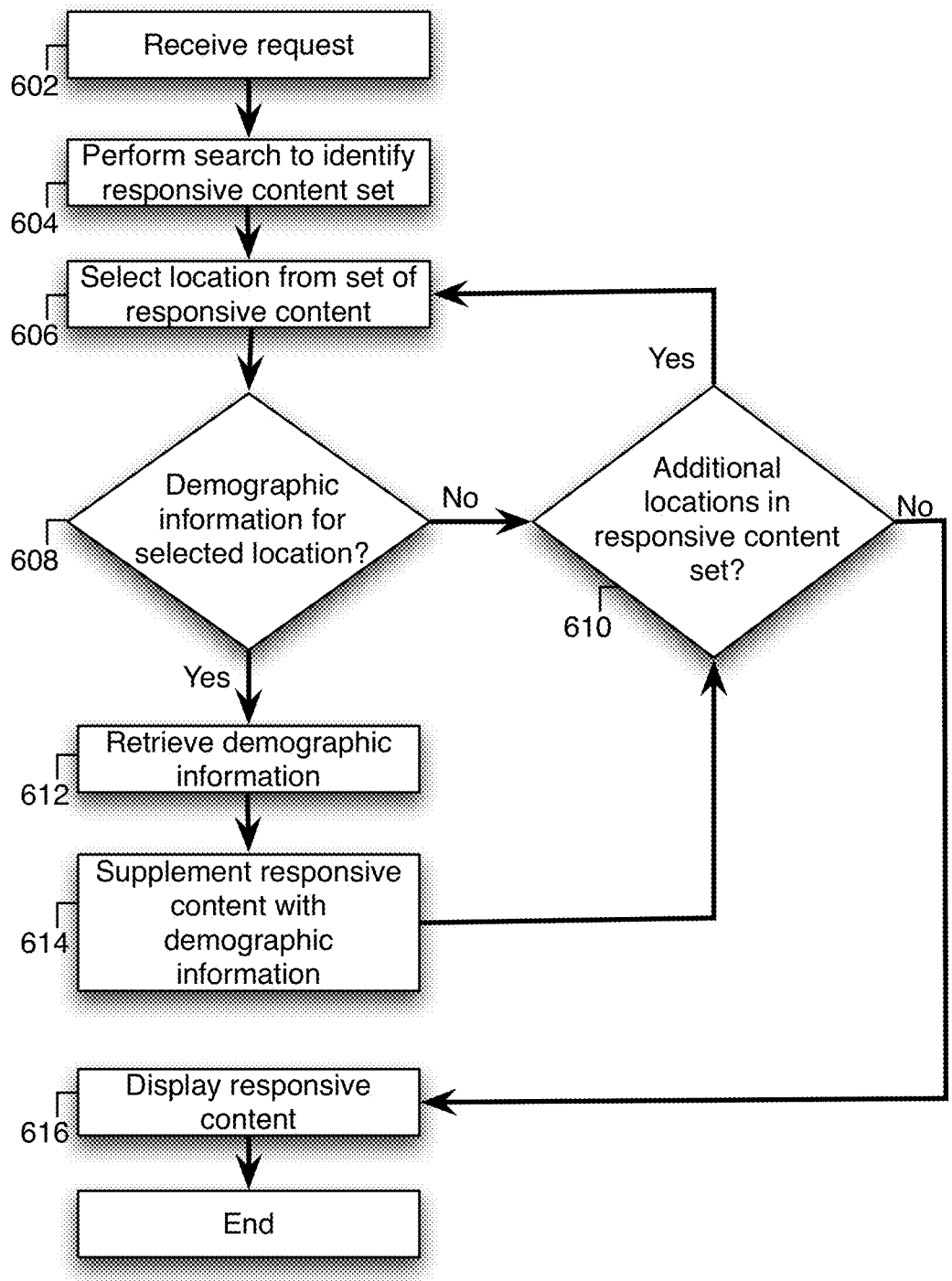
FIG. 6 is a flow diagram illustrating one embodiment of a method for providing information to a user regarding the demographic composition of one or more individuals at a given location according to one embodiment of the present invention.

FIG. 6 is a flow diagram illustrating one embodiment of a method for providing information to a user regarding the demographic composition of one or more individuals at a given location according to one embodiment of the present invention. According to the embodiment illustrated in FIG. 6, a request is received by a search provider from a user of a client device for information regarding one or more locations, step 602. Such request may comprise, for example, a search query delivered to a search provider, such as "best restaurants West Village, New York." In response to such search request, a search is performed to generate a result set comprising one or more locations responsive to such search request, step 604. Such result set may comprise, for example, one or more restaurants in the location specified by the user, such as restaurants in or near "West Village, New York."

A given location is selected from among the one or more locations identified as responsive to the search request, step 606. A check is thereafter performed to determine whether demographic information is available for the selected location, step 608. For example, the location selected in step 606 may comprise the restaurant "Restaurant ABC." A search in step 608 may be performed to determine whether any demographic information is available for Restaurant ABC, such as information regarding attributes of the one or more individuals currently at Restaurant ABC.

If demographic information is available for the selected location, the demographic information is retrieved, such as from one or more data stores or search providers, step 612. Such retrieving may comprise communicating via a network with one or more data stores maintaining attributes of the one or more individuals at the one or more locations responsive to the user search query. The set of responsive content is thereafter supplemented with the demographic information, step 614, which may comprise generating an indication, in the responsive content set to present to the user, that demographic information is available for the location. For example, the responsive content to be presented to the user may be supplemented with a hyperlink or icon indicating that demographic information is available for the location, and allowing the user to select the hyperlink or icon to obtain such demographic information.

After supplementing the selected location with demographic information step 214, or if no demographic information is available for the selected location, a check is performed to determine whether any additional locations require analysis from the one or more locations comprising the result set responsive to the search request, step 610. If one or more additional locations in the result set require analysis, a next location is selected, step 606. If no additional locations require analysis, the set of one or more locations, along with demographic content, if available, is displayed to the user, step 616. Such displaying may comprise displaying a variety of formats, including one or more summaries, graphs, tables, charts, maps, etc. Such information allows the user with which the search query originated to make a determination of whether to visit the one or more locations responsive to the user's search query based upon the attributes of the one or more individuals at the one or more locations.

Figure 7:
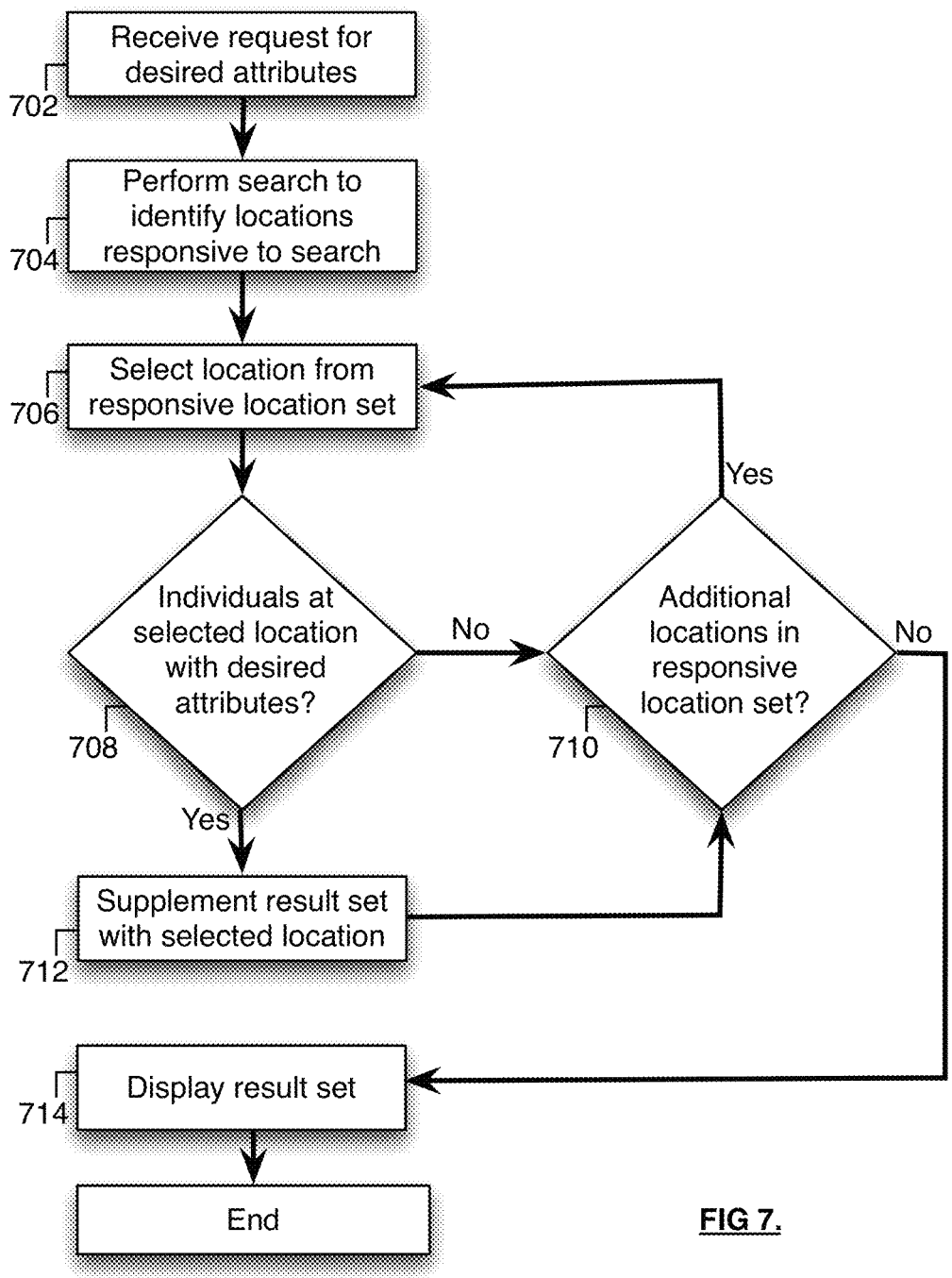
FIG. 7 is a flow diagram illustrating one embodiment of a method for identifying one or more locations at which one or more individuals with certain attributes are located according to one embodiment of the present invention.

FIG. 7 is a flow diagram illustrating one embodiment of a method for identifying one or more locations at which one or more individuals with certain desired attributes are located according to one embodiment of the present invention.

According to the embodiment illustrated in FIG. 7, a request for one or more locations in a given geographic area at which one or more individuals with one or more desired attributes are currently located is received by a search provider, step 702. For example, such a request may comprise a request for one or more locations in the East Village of New York City at which one or more females, aged twenty-five to thirty who are single are located. Similarly, such a request may comprise a request for one or more locations in the West Village of New York City at which one or more heterosexual males, residing in New York, that are between the ages of forty and fifty and are lawyers are located.

A search is performed of one or more data stores to identify one or more locations within the specified geographic area, step 704. For example, a search may be performed to identify the one or more bars in the East Village of New York City within the specified geographic region. A given location from the one or more locations is selected, step 706, and a check is performed to determine whether one or more individuals with the specified attributes are at the selected location, step 708. Such searching may be performed, for example, by a search provider or search engine, and may be performed of one or more tables or databases maintaining information regarding attributes of the one or more individuals at one or more locations.

For example, a given bar, such as "Bar XYZ," may be selected from the one or more locations, and with reference to the abovementioned example, a check may be performed to determine whether there are currently any females, aged twenty-five to thirty who are located Bar XYZ. If the selected location has one or more individuals with the desired attributes, the result set for display to the user with which the request originated is supplemented with the selected location, step 712.

If there are no individuals with the desired attributes at the selected location, or after supplementing the result set for display to the user, a check is performed to determine whether any additional locations are in the responsive location set, step 710. If one or more additional locations in the responsive location set require analysis, a next location is selected, step 706. If no additional locations require analysis, the one or more locations at which one or more individuals with the specified attributes are currently located are displayed to the user with which the request originated, step 714. Such display may comprise a variety of formats and orderings, such as ordering based upon the number of individuals with the desired attributes at the one or more locations, a map format, etc. Such display may also comprise presenting one or more filters, such as filtering according to smaller geographic region or zip code. According to another embodiment, such filtering comprises filtering according to one or more further desired attributes.

According to a further embodiment of the present invention, the systems and methods described herein may also be used to generate one or more alerts of locations or areas at which one or more individuals with attributes desired by the user are currently located. For example, a user of a mobile device may identify particular attributes that are desired by the user, such as "single," "female," and "age 23-28." Such desired attributes may be stored in the user's mobile device and/or a profile associated with the user. According to one embodiment, if the user is within a given proximity of one or more locations at which one or more individuals with attributes desired by the user are currently located, the user will receive an alert, such as an SMS message listing the one or more locations, an indication on a map highlighting or otherwise identifying the locations, etc. Such alerts may be generated by comparing the geographic coordinates of the mobile device associated with the user's mobile device and the coordinates of one or more nearby locations, and thereafter filtering the one or more identified nearby locations at which one or more individuals with attributes desired by the user are currently located through use of the systems and methods described herein. According to another embodiment, a user may preselect particular geographic regions for which the user wishes to receive alerts, in which case such alerts may be generated upon determining that there are one or more individuals with the desired attributes specified by the user at one or more locations within the geographic regions preselected by the user. Those of skill in the art recognize that alternate techniques may be used for generating alerts of locations at which one or more individuals with desired attributes are currently located through use of the systems and methods described herein.

FIGS. 1 through 7 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration. For example, it will be apparent to those skilled in the art that various modifications may be made in the present invention without departing from the spirit or scope of the invention. Such modifications may include using the systems and methods disclosed herein for uses other than commercial locations, such as parks, schools, concerts, neighborhoods and other areas where one or more individuals may enter and exit. Further, such modification s may include equipment and related technology for collecting attributes of individuals and allow individuals to choose not to participate or permit collection of such individuals' information through use of such equipment. Thus it is intended that the present invention cover the modifications and variations of this invention provided they come within the scope of the appended claims and their equivalents.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for providing information regarding demographic composition of a commercial establishment having preexisting boundaries, the method comprising:
   receiving information indicating presence of one or more mobile devices at a given commercial establishment having preexisting boundaries, a given mobile device of the one or more mobile devices associated with a given individual of one or more individuals;
   identifying one or more attributes of the one or more individuals with which the one or more mobile devices are associated;
   generating demographic composition information comprising one or more summaries of attributes of at least two or more individuals at the commercial establishment having preexisting boundaries using the one or more attributes of the at least two or more individuals with which the one or more mobile devices are associated;
   receiving information indicating absence of one or more of the one or more mobile devices from the commercial establishment, wherein receiving information indicating absence comprises receiving geographic coordinates of a mobile device and determining that the mobile device is not at the commercial establishment having preexisting boundaries by determining that the geographic coordinates associated with the mobile device are outside of the preexisting boundaries of the commercial establishment;
   updating the demographic composition information comprising the one or more summaries of the attributes of at least two or more individuals at the commercial establishment having preexisting boundaries, said updating comprising excluding from the one or more summaries of the attributes of at least two or more individuals at the commercial establishment at least a portion of the one or more attributes of the one or more individuals associated with the one or more mobile devices for which information indicating absence from the commercial establishment was received;
   retrieving a profile of a user proximately located and external to the commercial establishment;
   identifying, based on the retrieved profile of the user, one or more attributes desired by the user;
   determining whether a match exists between the one or more attributes desired by the user and the current demographic composition of the commercial establishment; and
   upon determining a match exists, generating a notification for delivery to the user proximately located and external to the commercial establishment.

2. The method of claim 1 wherein receiving information indicating presence of a mobile device at a given commercial establishment having preexisting boundaries comprises receiving geographic coordinates of a mobile device and determining that the geographic coordinates associated with the one or more mobile devices are within the preexisting boundaries of the commercial establishment.

3. The method of claim 1 wherein identifying one or more attributes of the one or more individuals with which the one or more mobile devices are associated comprises identifying at least two of relationship status, age, sex, religion, hobbies, occupation, race, national origin and sexual orientation.

4. The method of claim 1 wherein identifying one or more attributes of the one or more individuals with which the one or more mobile devices are associated comprises identifying one or more anonymous attributes.

5. A method for generating demographic composition information comprising one or more summaries of attributes of at least two or more individuals at a commercial establishment, the method comprising:
   receiving first information indicating presence of one or more mobile devices at a given commercial establishment having preexisting boundaries using geographic coordinates associated with the one or more mobile devices by determining that the geographic coordinates associated with the one or more mobile devices are within the preexisting boundaries of the commercial establishment, a given mobile device of the one or more mobile devices associated with a given individual of one or more individuals;

updating one or more data stores with said first information; receiving second information indicating absence of one or more of the one or mobile devices from the commercial establishment having preexisting boundaries, wherein receiving information indicating absence comprises receiving geographic coordinates of a mobile device and determining that the mobile device is not at the commercial establishment having preexisting boundaries by determining that the geographic coordinates associated with the mobile device are outside of the preexisting boundaries of the commercial establishment using geographic coordinates associated with the one or more mobile devices by determining that the geographic coordinates associated with the one or more mobile devices are outside of the preexisting boundaries of the commercial establishment;

updating the one or more data stores with said second information; and generating current demographic composition information comprising one or more summaries of the attributes of at least two or more individuals at the commercial establishment using one or more attributes associated with the one or more individuals with which the one or more mobile devices present at the commercial establishment are associated;

retrieving a profile of a user proximately located and external to the commercial establishment; identifying, based on the retrieved profile of the user, one or more attributes desired by the user;

determining whether a match exists between the one or more attributes desired by the user and the current demographic composition of the commercial establishment; and upon determining a match exists, generating a notification for delivery to the user proximately located and external to the commercial establishment.

6. The method of claim 5 wherein receiving first information indicating presence of one or more mobile devices at a given commercial establishment having preexisting boundaries comprises comparing geographic coordinates of one or more mobile devices with geographic coordinates of one or more commercial establishment having preexisting boundaries and determining that the geographic coordinates associated with the one or more mobile devices are within the preexisting boundaries of the commercial establishment.

7. The method of claim 5 wherein updating the one or more data stores with said second information comprises deleting, from the one or more data stores, at least a portion of the first information.

8. The method of claim 5 further comprising identifying, for a given mobile device, a time of entry and a time of exit with respect to the commercial establishment, using said first information and said second information, respectively.

9. The method of claim 5 wherein the one or more attributes comprise at least two or more of relationship status, age, sex, religion, hobbies, race, national origin and sexual orientation.

10. The method of claim 5 wherein the notification comprises a notification delivered to the user's mobile device.

11. The method of claim 5 wherein the notification comprises an SMS message identifying the commercial establishment.

12. The method of claim 5 wherein the notification comprises displaying the commercial establishment on a map.

* * * * *